US012607557B2

(12) United States Patent
Lange et al.

(10) Patent No.: US 12,607,557 B2
(45) Date of Patent: Apr. 21, 2026

(54) THz CROSS-CORRELATION DEVICE

(71) Applicant: Danmarks Tekniske Universitet, Kongens Lyngby (DK)

(72) Inventors: Simon Lehnskov Lange, Kongens Lyngby (DK); Oscar Garcia Garcia, Kongens Lyngby (DK); Thorsten Bæk, Kongens Lyngby (DK); Peter Uhd Jepsen, Kongens Lyngby (DK)

( * ) Notice: Subject to any disclaimer, the term of this patent is extended or adjusted under 35 U.S.C. 154(b) by 193 days.

(21) Appl. No.: 18/683,521

(22) PCT Filed: Aug. 22, 2022

(86) PCT No.: PCT/EP2022/073292
§ 371 (c)(1),
(2) Date: Feb. 14, 2024

(87) PCT Pub. No.: WO2023/025709
PCT Pub. Date: Mar. 2, 2023

(65) Prior Publication Data
US 2024/0426747 A1 Dec. 26, 2024

(30) Foreign Application Priority Data
Aug. 24, 2021 (EP) ..................................... 21192752

(51) Int. Cl.
*G01N 21/3586* (2014.01)
(52) U.S. Cl.
CPC ... *G01N 21/3586* (2013.01); *G01N 2201/068* (2013.01)
(58) Field of Classification Search
CPC ...................... G01N 21/3586; G01N 2201/068
See application file for complete search history.

(56) References Cited

U.S. PATENT DOCUMENTS 7,174,037 B2 2/2007 Arnone et al.
8,787,411 B2 * 7/2014 Wise ................... H01S 3/06725
372/18
(Continued)

FOREIGN PATENT DOCUMENTS

CN 105334181 2/2017
DE 102019100945 1/2019
(Continued)

OTHER PUBLICATIONS

XP 33885394A—Molter D et al—Layerthickness measurements with incoherent terahertz light, 2020, 45th International conference on infrared, Millimeter and Terahertz.
(Continued)

*Primary Examiner* — David P Porta
*Assistant Examiner* — Fani Polyzos Boosalis

(57) ABSTRACT

A terahertz (THz) cross-correlation device for material characterization of a sample comprising an optical source for outputting a continuous-wave (CW) optical signal; THz antennas providing a THz transmitter and a THz receiver optically coupled to the optical source, and an optical delay setup configured to adjust a synchronization of the THz receiver to the THz transmitter by the CW optical signal. The optical source is configured to provide a CW optical signal having an at least substantially continuous broadband spectrum and the optical paths for the CW signal are provided by optical waveguides such as optical fibres or integrated waveguides. The optical delay setup comprises a double-pass polarization-conserving fibre stretcher comprising a circulator, a fibre stretcher, and a Faraday mirror; and/or a variable solid state optical delay (SSOD).

11 Claims, 4 Drawing Sheets

(56)
References Cited

U.S. PATENT DOCUMENTS

| | | | | |
|---|---|---|---|---|
| 9,008,133 | B2 * | 4/2015 | Renninger | H01S 3/067 |
| | | | | 372/6 |
| 9,228,826 | B2 | 1/2016 | Ryu et al. | |
| 2004/0052276 | A1 | 3/2004 | Lou et al. | |
| 2015/0069246 | A1 | 3/2015 | Itsuji | |

FOREIGN PATENT DOCUMENTS

| | | |
|---|---|---|
| EP | 2136443 | 12/2009 |
| WO | WO2020/148218 | 7/2020 |

OTHER PUBLICATIONS

XP 55874281A—Agiltron—Integrated Solid State Varibale Photonic Time Delay. 2014, MA 01801, USA.

XP 60002572A—Bush Jeff et al—Fiber Fizeau interferometer for remote passive sensing, Fiber Optic Sensors and Applications, IX, proc. of SPIE vol. 8370, 2012.

XP 36959596A—Rehn Arno et al—Increasing the THz-QTDS Bandwidth from 1.7 to 2.5 THz Through Optical Feedback. Nov. 26, 2019, Springer Science+Business Media LLC.

XP 55041015A—N. Krumbholz et al. Handheld terahertz spectrometer for the detection of liquid explosive. Milimetre Wave and Terahertz Sensors and Technology, 2009, vol. 7485.

Molter, Freymann—Terahertz cross-correlation spectroscopy driven by incoherent light from a superluminescent diode. vol. 27, No. 9, 129 Apr. 2019, Optics Express 12659.

Molter, D et al, Two decades of terahertz cross-correlation spectroscopy. Appl Pys, Rev, 8, 2021, Apr. 27, 2021.

Molter, D. et al. Interferometry-aided terahertz time-domain spectroscopy. Mar. 23, 2018, Optics Express, vol. 25, No. 7, Apr. 3, 2017.

* cited by examiner

THz CROSS-CORRELATION DEVICE

FIELD

The invention relates to a device for determination and characterization of materials using THz radiation.

BACKGROUND

Terahertz (THz) time domain spectroscopy (TDS) is an established but still emerging method for material characterization in relation to, among others, spectroscopy, and thickness measurements. Terahertz cross-correlation spectroscopy is an alternative approach to TDS and enables phase-sensitive measurements without the need for an ultrafast pulsed laser source, see e.g. Appl. Phys. Rev. 8, 021311 (2021); doi: 10.1063/5.0037395.

THz is a part of the electromagnetic spectrum with characteristics that allow it to penetrate materials otherwise impenetrable by other electromagnetic frequencies. Therefore, THz is gaining more and more attention for commercial material inspection as it has a wide range of use. Material determination and characterization using THz techniques still awaits its commercial breakthrough as the available systems are expensive, bulky, and susceptible to environmental noise, such as temperature and humidity fluctuations, vibrations and shocks.

SUMMARY

In its broadest aspect, the present invention relates to a terahertz cross-correlation device for material characterization of a sample by means of electromagnetic radiation in a spectral range [0.1; 10 THz], the device comprising:

an optical source for outputting a continuous-wave (CW) optical signal;
    a THz transmitter optically coupled to the optical source, the THz transmitter configured to emit THz radiation towards a sample when modulated by the CW optical signal;
    a THz receiver optically coupled to the optical source, the THz receiver being configured to detect THz radiation by generating an electric detection signal that is a result of an interference between the THz radiation and the CW optical signal; and
    an optical delay setup configured to adjust a synchronization of the THz receiver to the THz transmitter by the CW optical signal.

The optical source is preferably configured to provide a CW optical signal having an at least substantially continuous broadband spectrum. Optical paths for the CW signal from the optical source to the optical delay component, the THz transmitter, and the THz receiver are preferably provided by optical waveguides. The optical delay setup preferably comprises:

a double-pass polarization-conserving fibre stretcher comprising a circulator, a fibre stretcher, and a Faraday mirror arranged for the circulator and the fibre stretcher to receive the CW optical signal propagating in a first direction and in a second, opposite direction, the change in direction being due to a reflection in the Faraday mirror; and/or
    a variable solid state optical delay (SSOD) comprising two or more optical ports, one or more optical waveguide sections for connecting two optical ports, and actuation means for varying an optical path length between the two connected optical ports.

In another aspect, the present invention relates to a terahertz (THz) cross-correlation device for material characterization of a sample by means of electromagnetic radiation with frequencies between 0.1 THz and 10 THz, the device comprising:

an optical source for outputting a continuous-wave (CW) optical signal;
    a THz transmitter optically coupled to the optical source, the THz transmitter configured to emit THz radiation towards a sample when modulated by the CW optical signal;
    a THz receiver optically coupled to the optical source, the THz receiver being configured to detect THz radiation by generating an electric detection signal that is a result of an interference between the THz radiation and the CW optical signal;
    a beam-splitter for receiving the CW signal from the optical source and defining a first arm providing optical coupling between the beam splitter and the THz transmitter, and a second arm providing optical coupling between the beam splitter and the THz receiver; and
    an optical delay setup configured to adjust a synchronization of the THz receiver to the THz transmitter by the CW optical signal;

wherein:

the optical source is configured to provide a CW optical signal having a continuous broadband spectrum;
    optical paths for the CW signal from the optical source to the optical delay component, the THz transmitter, and the THz receiver are provided by optical waveguides;
    the optical delay setup comprises a first double-pass polarization-conserving fibre stretcher in the first arm and a second double-pass polarization-conserving fibre stretcher in the second arm, each double-pass polarization-conserving fibre stretcher comprising a circulator, a fibre stretcher, and a Faraday mirror arranged for the circulator and the fibre stretcher to receive the CW optical signal propagating in a first direction and in a second, opposite direction, the change in direction being due to a reflection in the Faraday mirror.

The invention also relates to a method of performing a terahertz cross-correlation measurement of a sample using the above terahertz cross-correlation device.

The following figures and examples are provided below to illustrate the present invention. They are intended to be illustrative and are not to be construed as limiting in any way.

DETAILED DESCRIPTION

Figure 1:
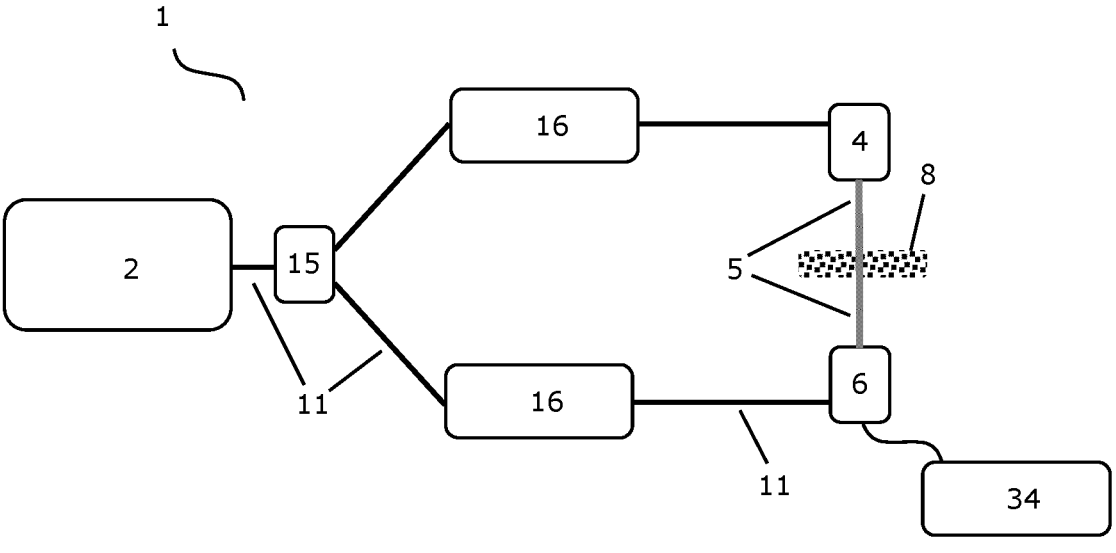
FIG. 1 is a diagram illustrating an exemplary terahertz cross-correlation device according to this disclosure.

The invention provides a terahertz cross-correlation device for material characterization of a sample by means of electromagnetic radiation in a spectral range [0.1; 10 THz].

The terahertz cross-correlation device comprises an optical source such as, but not limited to, a pump and/or seed optical source coupled to an optical amplifier. In an exemplary embodiment, the frequency spectrum from the source (with/without amplifier) is continuous, such as at least substantially continuous, in that the spectrum is void of sharp peaks such as mode peaks. This is elaborated in the following looking at both spectroscopy applications and time-domain applications. In the frequency domain, a CW source with a multimode spectrum (for example a multimoded laser diode) will create a THz spectrum which is also multimoded, i.e., not continuous. This generally makes it less useful for spectroscopic applications since it will only contain information about certain frequencies (the modes) but lacks the rest of the spectrum. When using the cross-correlation device for material characterization such as determining thickness of layers, one is mainly interested in the time domain. In the time domain, a multimoded laser will create a 'train' of THz pulses. When investigating material layers of a sample, each layer produces a reflection that is shown as a pulse shifted in time with respect to others. With a multimode spectrum, the reflections of each pulse in the train of pulses may overlap with the next pulse, making it hard to differentiate between the reflections and to retrieve the thickness.

Thus, it is preferred to use a continuous spectrum source. There exist prior art references using multimode laser diodes as optical sources in THz quasi TDS systems because they can easily provide the necessary amount of optical power, are easy to operate and characterize, and are cheap. Such references are generally proof-of-concept publications that cannot deliver the precision required for an industrial application system. In an exemplary embodiment, the optical source is therefore not a multimode laser source such as a multimode laser diode.

In an exemplary embodiment, the spectrum from the optical source is a broadband spectrum having an optical bandwidth of at least 2 nm such as at least 5 nm. With present THz antennas, the bandwidth of the THz signal is proportional to the bandwidth of the CW optical signal. Therefore, in another exemplary embodiment, the spectrum from the optical source is a broadband spectrum that, when received by the THz transmitter, results in the generation of a THz signal with a bandwidth of at least 0.1 THz, such as at least 0.5 THz or at least 1 THz. As a note, at 1550 nm, an optical bandwidth of 8 nm corresponds to a THz bandwidth of approximately 1 THz. This conversion is only true for 1550 nm, at shorter wavelengths, smaller optical bandwidth is needed to obtain the same THz bandwidth. In the present specification, a broadband spectrum of the optical source means a spectrum having a $-3$ dB bandwidth $\Delta\lambda$ and a centre wavelength $\lambda$, with $c\Delta\lambda/\lambda > 0.1$ THz, such as $> 0.2$ THz, such as $> 0.5$ THz. The broader the broadband spectrum of the optical source is, the more spectral information can be retrieved from the sample, thus increasing the functionality of the device for the user.

The center frequency of the broadband spectrum can be selected depending on the optical source or the type of antenna substrate in the THz transmitter and receiver. In one embodiment, the center frequency is around 1550 nm. This is advantageous since commercial light sources and fibre optics from telecom can be used. In another embodiment, the centre wavelength is shorter—such as 1064 nm or 960 nm—which is advantageous since a smaller bandwidth of the optical source is needed to meet the 0.1 THz requirement. A further advantage is that cheaper and/or better semiconductor materials for the antennae are available for these shorter wavelengths.

As will be described in more detail later, the optical CW source may comprise an amplified spontaneous emission (ASE) source, a superluminescent diode (SLED, SLD), a light emitting diode (LED), an erbium doped fibre amplifier (EDFA), and any combination of those.

TDS using short laser pulses typically require the use of free-space optics since short and ultrashort laser pulses must propagate in free space to avoid nonlinear effects. Such free-space optics includes lenses, prisms and mirrors to control the direction and vergence of the light and mechanical translation stages to control the optical delay between the arms, see e.g. "Interferometry-aided terahertz time-domain spectroscopy," Opt. Express, 25(7), 7547-7558 (2017); doi: 10.1364/OE.25.007547). These free-space optical components are disadvantageous since mirrors, lenses and mechanical translation stages are bulky and their alignment is sensitive to environmental noise and any movement of the device.

A terahertz cross-correlation device using a CW optical signal in accordance with the invention means that the free-space requirement can be relaxed which allows for a new approach in the design of the device.

In the present specification, an optical waveguide is a system or material designed to confine and direct electromagnetic waves in a direction determined by the physical boundaries of the waveguide. Typical waveguide types are optical fibres, channel waveguides and planar waveguides. In the terahertz cross-correlation device of the invention, optical paths for the CW signal from the optical source to the optical delay component, the THz transmitter, and the THz receiver are preferably provided by optical waveguides, thus ensuring a full optical waveguide path for the device. Thereby, the device does not rely on lenses and mirrors to control the direction and vergence of the optical signal along the optical path. In a free-space setup, lenses and mirrors are bulky components and require a precise and stable alignment. A full optical waveguide path is thus advantageous since it is less sensitive to variations in humidity and temperature, mechanical vibrations, and shocks. In addition, the use of optical waveguides allows for reducing the overall size of the device. In an alternative formulation, it is preferred that the CW optical signal does not propagate in free-space (i.e. through the air of the environment) at any point during its path to the THZ antennae.

The optical path between the optical source and the optical delay setup comprises a beam splitter for dividing the optical path into first arm providing optical coupling between the beam splitter and the THz transmitter, and a second arm providing optical coupling between the beam splitter and the THz receiver. Such beam splitter will thus also divide an optical signal from the optical source into two separate optical. In one example, the beam splitter is a 50/50 splitter providing two optical signals of similar power. In another example, the beam splitter provides two optical signals with one having significantly higher power than the other, such as a 60/40, 70/30 or 80/20 split, where the higher power signal will typically be for the THz transmitter. The beam splitter is positioned between the optical source and the optical delay setup.

The optical delay setup of the disclosure provides advantages over traditional free-space translation stage delays since they do not involve mechanically moving parts or separate mirrors and lenses that must be kept in precise alignment with other optical components. They are therefore advantageous since they are more robust and less sensitive to mechanical vibrations and shocks. They are further advantageous since the optical signal propagates in solid matter instead of free space and is therefore much less sensitive to environmental parameters such as pressure, temperature, humidity, gases, aerosols etc.

The optical delay setup preferably comprises:

a double-pass polarization-conserving fibre stretcher comprising a circulator, a fibre stretcher, and a Faraday mirror arranged for the circulator and the fibre stretcher to receive the CW optical signal propagating in a first direction and in a second, opposite direction, the change in direction being due to a reflection in the Faraday mirror; and/or a variable solid state optical delay (SSOD) comprising two or more optical ports, one or more optical waveguide sections for connecting two optical ports, and actuation means for varying an optical path length between the two connected optical ports.

To achieve high-precision terahertz cross-correlation measurements, the optical signals driving both THz antennae are preferably in phase. On the other hand, using a broadband spectrum optical source will typically result in a coherence length of the order of centimetres. Therefore, in an exemplary embodiment, an optical path length of the first arm, $L_1$, and an optical pathlength of the second arm, $L_2$ are equal within a range corresponding to a coherence length of the optical signal. In another exemplary embodiment, an optical path length of the first arm, $L_1$, and an optical pathlength of the second arm, $L_2$ are preferably equal within half the stroke of the optical delay setup, where the stoke is the maximum difference in optical path length between the two arms achievable by the optical delay setup. In yet another exemplary embodiment, an optical path length of the first arm, $L_1$, and an optical pathlength of the second arm, $L_2$ are preferably equal within a length of 5 cm.

Depending on the specific application of the terahertz cross-correlation device, the scanning range of the optical delay setup may be in the order of tenths to thousands of picoseconds, with time-steps typically in the order of 10-100 femtoseconds. While it is not a requirement to have a continuous time-scan, is preferable to satisfy Nyquist's sampling theorem. For example, for a system with 3 THz bandwidth, Nyquist theorem states that the time-step should be 166 fs.

In an exemplary embodiment, the optical delay setup comprises a double-pass polarization-conserving fibre stretcher in each of the first and second arms. These double-pass polarization-conserving fibre stretchers are preferably identical or identical except for a small difference in the optical path length of the fibre stretcher, this difference being of the order of the desired scanning range. This setup is advantageous since it provides identical or almost identical optical paths—with respect to both the optical path-length and any distorting effects—for the CW optical signal in the first and second arms. This again ensures that the CW optical signals applied to the THz antennae are in phase over the stroke of the optical delay setup.

The double-pass polarization-conserving fibre stretcher is an optical delay component comprising an optical circulator, a fibre stretcher, and a Faraday mirror arranged for the optical circulator and the fibre stretcher to receive the CW optical signal propagating in a first direction and in a second, opposite direction, the change in direction being due to a reflection in the Faraday mirror.

The optical circulator is an optical device with three or more ports designed such that light entering any port exits from the next. This means that if light enters port 1 it is emitted from port 2, but if some of the emitted light is reflected back to the circulator, it does not come out of port 1 but instead exits from port 3. Optical circulators are typically used to separate optical signals that travel in opposite directions, for example to achieve bi-directional transmission over a single fibre.

The double-pass polarization-conserving fibre stretcher also comprises a Faraday mirror which is a combination of a 45 degrees Faraday rotator and a mirror. Since the Faraday rotator rotates the polarization of the light in the same direction with respect to the direction of propagation on both passes, the optical signal reflected by the Faraday mirror will return with the polarization rotated by 90 degrees.

In the double-pass polarization-conserving fibre stretcher, the delay is produced by physically stretching an optical fibre of the fibre stretcher to extend the optical path. In an exemplary embodiment, the fibre stretcher is a section of optical fibre, e.g. 50-100 meters, tightly wound around a piezo crystal or another electrostrictive material that can be strained by applying an electric voltage. The longer the fibre and the more it is stretched, the larger is the resulting optical delay. Numerous fibre stretchers are commercially available that may be used in this setup.

One end of the fibre stretcher is optically coupled to the optical source via a waveguide and the optical circulator, and the other end of the fibre stretcher is equipped with a Faraday mirror. The optical signal will be received by the circulator, acquire a delay in the fibre stretcher, be reflected by the faraday mirror and then pass through the fibre stretcher once more to acquire an additional delay. Arriving at the optical circulator from the fibre stretcher, the optical signal will be coupled to a different optical waveguide propagating towards the THz transmitter or receiver. The Faraday mirror will rotate the polarization of the optical signal 90 degrees so that any polarization changes caused by the stretching of the optical fibre in the fibre stretcher during the first pass is reciprocated during the second pass. The 90 degrees rotation is advantageous as the THz transmitter and receiver are sensitive to the polarization of the optical signal. The double-pass polarization-conserving fibre stretcher is also advantageous because the optical signal passes the fibre stretcher twice in opposite directions—thus 'double-pass'. As explained above, this has the effect of reciprocating the birefringence existing in the fiber which is the effect leading to the polarisation rotation. Further, it has the effect that the additional optical pathlength resulting from stretching the fibre, and thereby also the optical delay, is doubled, which means that the component can be made smaller. In addition, fibre stretchers are advantageous since they provide a continuous adjustment of the optical delay and can therefore be used to provide time-steps at any desired length.

The variable solid state optical delay (SSOD) is an optical delay component comprising two or more optical ports, such as ports for coupling an input signal and an output signal to an optical waveguide, one or more optical waveguide sections for connecting two optical ports, and actuation means for varying an optical path length between the two connected optical ports. Such solid state optical delay are also referred to as Non-Mechanical Variable Optical Time Delay Line or solid state delay line (SSDL), In an exemplary embodiment, the variable solid state optical delay comprises two or more optical waveguide sections of different lengths for connecting two optical ports, and wherein the actuation means are configured to select one or a combination of the two or more optical waveguide sections to connect the two or more optical ports. Hence, in this embodiment, the optical path length between the two ports is varied by the selection of different routes of different length. In this embodiment, the two or more different optical waveguide sections in the variable solid state optical delay may be fibre loops or channel/planar waveguides sections of varying lengths formed on a substrate. The actuation means can select one of the optical waveguide sections or connect two or more of the optical waveguide sections in series to provide a set of selectable discrete optical delays. Some SSODs may, in addition, provide some continuous adjustment of the optical pathlength around or between one or more discrete optical delays. The actuation means may for example be an opto-mechanical fibre switch or a MEMS (Micro Electro Mechanical System) switch which are advantageous since they do not involve macroscopic moving parts. In an exemplary embodiment, the variable solid state optical delay is a non-mechanical optical delay, where the actuation means may comprise one or more of thermo-optic switch, electro-optic switch, acousto-optic switch, magneto-optic switch. In addition to the increased robustness and lack of free-space propagation, a variable solid state optical delay is advantageous since it is stripped of any moving parts, mirrors, lenses, and can be minoritized to fit on a single chip. In an exemplary embodiment, the SSOD comprises durable and high reliability optical switches capable of at least $10^9$ switching cycles.

In another exemplary embodiment of the variable solid state optical delay, the optical path length between the two ports is varied by modulating a material property (preferably excluding stretching) of an optical waveguide section connecting the ports. In one embodiment, this could be a modulation of a refractive index or a birefringence of the waveguide material. One example of such variable solid state optical delay could be an acousto-optic delay module where the actuation means transmits an acoustic signal through a birefringent crystal, leading to a change of grating positions and thereby a change in the diffraction of the optical signal and ultimately a different optical pathlength.

In an exemplary embodiment of the variable solid state optical delay, the SSOD comprises temperature stabilisation to stabilise the temperature of the SSOD. This is advantageous since changes in temperature will change the refractive index of the waveguide media, resulting in a different path length, which will affect the interference pattern. In another exemplary embodiment, the SSOD comprises low-loss waveguide media, such that propagation through the different paths in the SSOD does not change the optical power at the output substantially.

In an exemplary embodiment, the optical delay setup of the terahertz cross-correlation device comprises at least a first optical delay component in the first arm and a second optical delay components in the second arm, i.e. each arm comprises at least one optical delay component. Preferably, each of the first and second delay components comprises:

a double-pass polarization-conserving fibre stretcher; or
a variable solid state optical delay.

In one example, the optical delay setup of the terahertz cross-correlation device comprises both a double-pass polarization-conserving fibre stretcher and a variable solid state optical delay. These may be provided in parallel (in different arms) or in series (in the same arm). The variable solid state optical delay preferably provides a set of discrete optical delays that can be selected by the actuation means and where a largest difference between two following optical delays is D. In one example, the double-pass polarization-conserving fibre stretcher is adapted to provide a continuous optical delay adjustment equal to or larger than D. This combination is advantageous since it allows for a large range of optical delays to be scanned continuously.

The invention also relates to the process of performing a terahertz cross-correlation measurement of a sample using the above terahertz cross-correlation device. Such terahertz cross-correlation measurement may be terahertz cross-correlation spectroscopy as described in e.g. "Terahertz cross-correlation spectroscopy driven by incoherent light from a superluminescent diode", Opt. Express 27, 12659-12665 (2019); doi: 10.1364/OE.27.012659. The measurements may be material characterization measurements such as thickness measurements that, though often referred to as spectroscopy, do not necessarily result in a reflection, absorption or transmission spectrum of the sample being provided.

Various examples and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the examples. They are not intended as an exhaustive description of the disclosure or as a limitation on the scope of the disclosure. In addition, an illustrated example needs not have all the aspects or advantages shown. An aspect or an advantage described in conjunction with a particular example is not necessarily limited to that example and can be practiced in any other examples even if not so illustrated, or if not so explicitly described.

FIG. 1 is a diagram illustrating an exemplary terahertz cross-correlation device 1 according to the disclosure. The device comprising an optical source 2 for outputting a continuous-wave (CW) optical signal, a THz transmitter 4 optically coupled to the optical source 2, the THz transmitter configured to emit THz radiation 5 towards a sample 8 when modulated by the CW optical signal, a THz receiver 6 optically coupled to the optical source 2, the THz receiver being configured to detect THz radiation 5 by generating an electric detection signal that is a result of an interference between the THz radiation 5 and the CW optical signal, and an optical delay setup 16 configured to adjust a synchronization of the THz receiver 6 to the THz transmitter 4 by the CW optical signal. The device 1 may comprise a beam splitter 15 facilitating the optical coupling of both the THz transmitter 4 and the THz receiver 6 to the optical source 2.

The terahertz cross-correlation device 1 may be used in a variety of applications with different signals to be measured from a sample. In FIG. 1, the THz transmitter 4 and receiver 6 are set up for measuring radiation 5 transmitted by the sample 8, whereas in FIGS. 4 and 5 they are set up to measure radiation 5b reflected by the sample 8.

Optical paths for the CW signal from the optical source to the optical delay component, the THz transmitter, and the THz receiver are preferably provided by optical waveguides 11, such as optical fibre, channel waveguides and planar waveguides. In an exemplary embodiment, the optical path is a full optical waveguide path meaning that no part of the optical path of the CW optical signal is situated outside of an optical waveguide 11. This has the effect that the CW optical signal at no point propagates in free space, i.e. in the atmosphere of the environment where the device 1 is situated.

Figure 3:
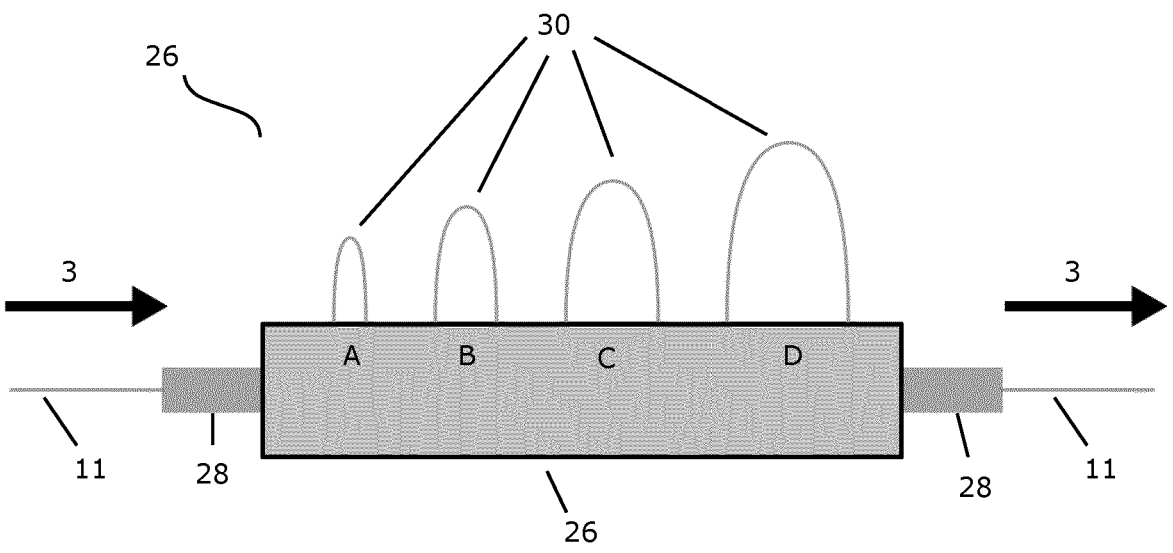
FIG. 3 illustrates an exemplary variable solid state optical delay according to this disclosure.
Figure 4:
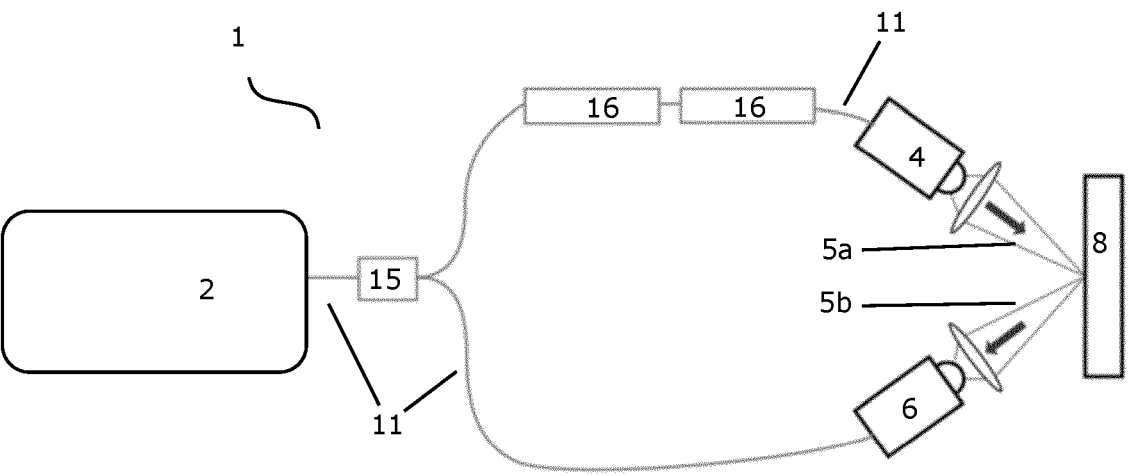
FIGS. 4-6 illustrate different exemplary terahertz cross-correlation devices according to this disclosure.
Figure 5:
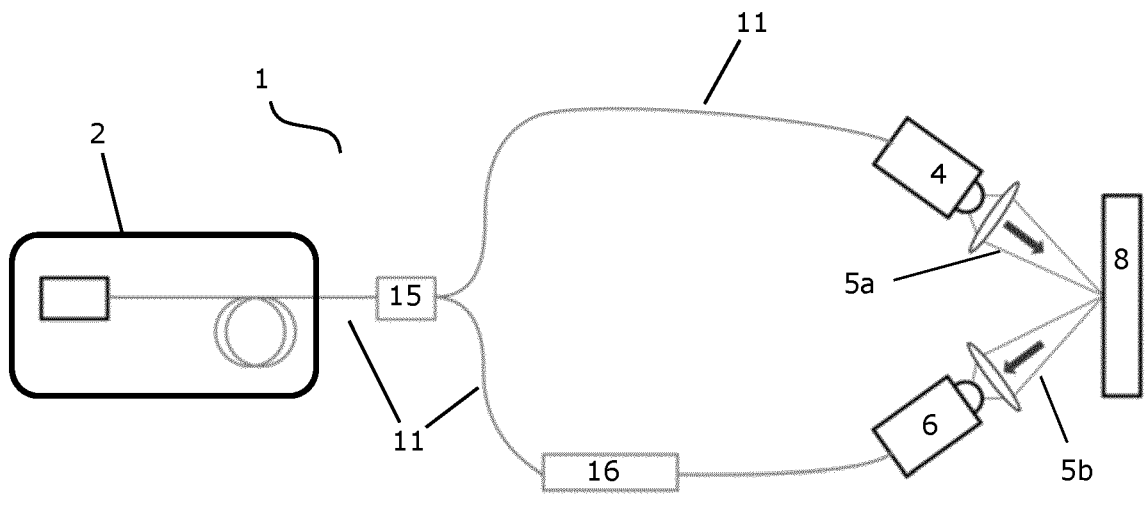

The optical delay setup 16 may have one or more optical delay components in both the arm to the THz transmitter and in the arm to the THz receiver, as in FIG. 1, or only in one of the arms (see e.g. FIGS. 4 and 5). Exemplary embodiments of the one or more optical delay components of the optical delay setup 16 will be described in the following with reference to FIGS. 2 and 3.

Figure 2:
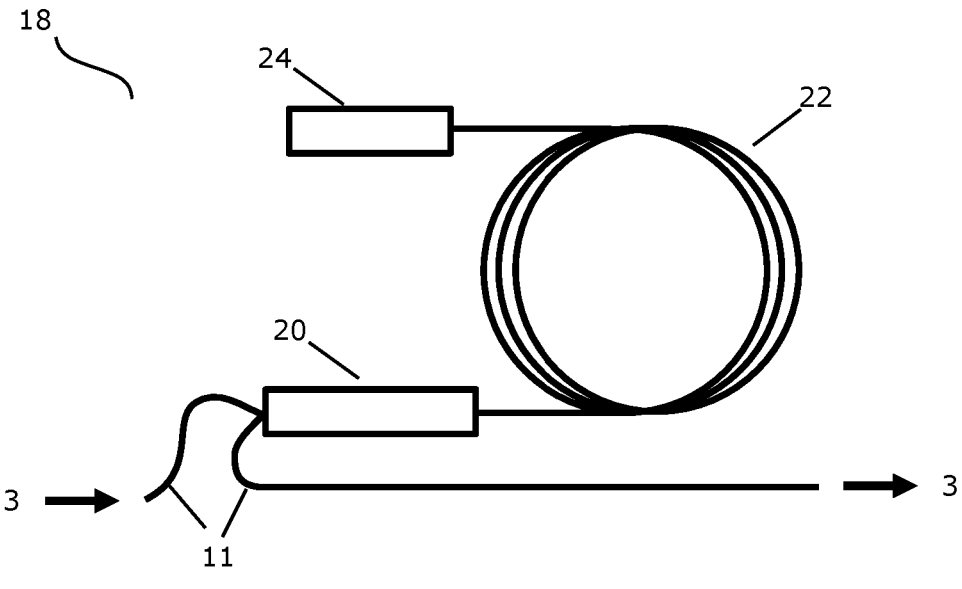
FIG. 2 illustrates an exemplary double-pass polarization-conserving fibre stretcher according to this disclosure.

FIG. 2 illustrates an exemplary embodiment of a double-pass polarization-conserving fibre stretcher 18 comprising a circulator 20, a fibre stretcher 22, and a Faraday mirror 24 arranged for the circulator 20 and the fibre stretcher 22 to receive the CW optical signal 3 propagating in a first direction and in a second, opposite direction, the change in direction being due to a reflection in the Faraday mirror 24. Input and output ports of the circulator 20 are coupled to the optical waveguide 11. The fibre stretcher 22 may be a commercially available fibre stretcher.

FIG. 3 illustrates an exemplary embodiment of a variable solid state optical delay 26 comprising two optical ports 28, optical waveguide sections 30 of different lengths-here optical fibre sections A-D—for connecting the optical ports 28 and actuation means 26 for selecting one or a combination of the optical waveguide sections 30 to connect optical ports 28. The optical ports 28 are coupled to the optical waveguide 11 for receiving and transmitting CW optical signal 3.

Figure 6:
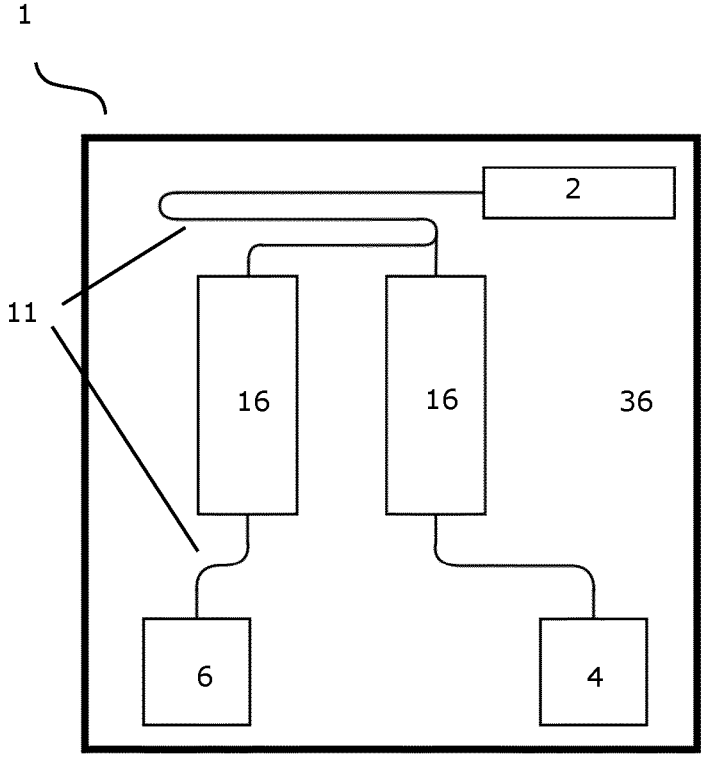

FIGS. 4 through 6 illustrate further exemplary embodiments of the terahertz cross-correlation device 1 according to the disclosure. Individual features described in relation to either of these embodiments or the embodiment illustrated in FIG. 1 may be combined with features of the other embodiments.

In the device 1 illustrated in FIGS. 4 and 5, the THZ antennae 4 and 6 are set up to irradiate the sample 8 with THz radiation 5a and measure THz radiation 5b reflected from the sample.

In the device 1 illustrated in FIGS. 4 and 5, the optical waveguide 11 is provided by optical fibre. The type of optical fibre used may be selected from commercially available single mode or multimode optical fibre types. The optical fibre may be selected dependent upon parameters such as wavelength spectrum and field strength of the CW optical signal, length of the optical waveguide 11, desired price/quality of the device, etc.

In the device 1 illustrated in FIG. 6, the optical waveguide 11 is provided by a channel waveguide or a planar waveguide formed on or integrated in a substrate 36 of a semiconductor device. In this exemplary embodiment, all the components may be integrated on-chip (on a photonic circuit), whereby the system can be made more compact and smaller, and fabrication can be scaled-up by using already existing methods in semiconductor processing.

In the device 1 illustrated in FIG. 1, the optical delay setup 16 comprises at least one optical delay component in each arm of the device. In the device 1 illustrated in FIG. 4, the optical delay setup 16 comprises at least two optical delay components in one arm of the device (here in the arm to the THz receiver but may be in the arm to the THz transmitter instead). The resulting at least two optical delay components may be:

two double-pass polarization-conserving fibre stretchers 18;

two variable solid state optical delays 26;

a double-pass polarization-conserving fibre stretcher 18 and a variable solid state optical delay 26;

a double-pass polarization-conserving fibre stretcher 18 and a different optical delay component;

a variable solid state optical delay 26 and a different optical delay component.

In the device 1 illustrated in FIG. 5, the optical delay setup 16 comprises only a single optical delay component in only one arm of the device (here in the arm to the THz receiver but may be in the arm to the THz transmitter instead). The optical delay component may be either a double-pass polarization-conserving fibre stretcher 18 or a variable solid state optical delay 26.

While all the above combinations are applicable, it is preferable to keep the arms as symmetric as possible whereby environmental parameters, in particular any temperature change, will affect both arms as similar as possible resulting in higher precision. For example, when one arm involves a double-pass polarization-conserving fibre stretcher, in order to have approximately the same overall path length on both arms, it is advantageous to also have a double-pass polarization-conserving fibre stretcher in the other arm or a non-stretching fibre coil with circulator and faraday mirror to match both the overall path length and the reciprocating of the birefringence of the fiber. Including just a fibre coil with double the length of the fibre stretcher 22 would introduce asymmetric birefringence effect.

In a preferred exemplary embodiment, the optical delay setup 16 comprises a double-pass polarization-conserving fibre stretcher 18 in each arm and a variable solid state optical delay 26 in one of the arms. This would be a combination of the systems of FIGS. 1 and 4. Here, the fiber stretchers provide small, variable time-steps, while the solid state delay provide coarse time-steps.

The THz transmitter and receiver are generally THz antennas. One exemplary type is a 'CW photomixer' with a semiconductor structure (which may in itself be composed of many different layers of semiconductor) and a metallic antenna (typically bowtie or dipole antenna). Here, the optical signal excites the semiconductor while a voltage bias is applied to the antenna poles (for the emitter) or the current generated in the antenna is measured (for the receiver). Other applicable THz antennas exist, and new ones may be developed that are equally applicable in the devise of the invention.

The terahertz cross-correlation device 1 may comprise THz optics 7 in relation to the THz transmitter 4 and THz receiver 6, see e.g. FIGS. 4 and 5. Such THz optics 7 may comprise lenses, mirrors, polarizers, beam splitters etc. adapted for EM radiation in the THz range and used to control the direction and vergence of the THz signal 5 to and from the sample 8. The THz receiver 6 is configured to detect THz radiation 5 by generating an electric detection signal that is a result of an interference between the THz radiation 5 and the CW optical signal 3. For this purpose, the device 1 may be connected to an electronic processor 34 for receiving and processing the electric detection signal from the THz receiver 6 as illustrated in FIG. 1.

The optical source and the optical components may work on any wavelength, typically in the visible or infrared, where the THz transmitter and receiver will have to match this wavelength. In preferred embodiments, the optical source works at 1550 nm to benefit from the availability of optical components for telecom.

In one exemplary embodiment, the optical source 2 comprises an optical seed signal connected into an optical amplifier which amplifies the seed signal. In a preferred embodiment, the seed signal is a continuous broadband signal provided by a light emitting diode (LED) or a superluminescent diode (SLED), preferably at 1550 nm, and the optical amplifier an erbium doped fiber (EDFA). This type of optical source is typically referred to as an EDFA and is illustrated in FIG. 5. In another exemplary embodiment (not shown), an optical seed signal may be amplified electrically, such as in a setup where an LED seed is amplified by a semiconductor optical amplifier.

In another exemplary embodiment, the optical source 2 comprises a pump signal connected into a medium that absorbs the pump signal and re-emits it at a larger wavelength and with large continuous bandwidth via an amplified spontaneous emission process (ASE). Preferably, the pump signal is provided by a pump laser and the ASE medium is a doped fiber. In an exemplary embodiment, the pump laser could be a 980 nm laser and the ASE medium an erbium doped fibre that absorbs 980 nm an re-emits at 1550 nm with a larger bandwidth. This type of optical source is typically referred to as an ASE and is illustrated in FIG. 5.

Figure 7:
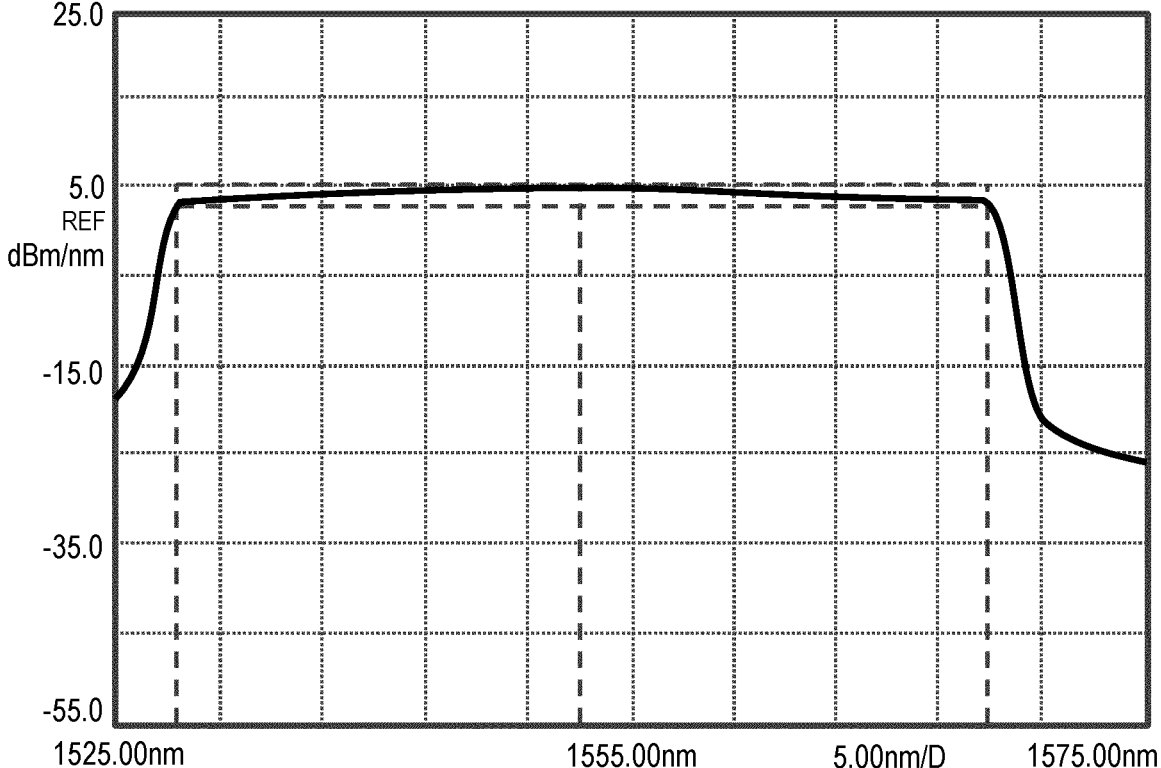
FIG. 7 illustrates an exemplary continuous broadband spectrum according to this disclosure.

FIG. 7 shows an exemplary continuous broadband spectrum of an optical source of the invention. The spectrum is centered around 1550 nm, has a bandwidth of 40 nm, and is void of any mode peaks or other discontinuities.

As mentioned previously, the THz cross-correlation device may be used in different applications, and the disclosure provides a method of performing a terahertz cross-correlation measurement of a sample using the terahertz cross-correlation device. In an exemplary embodiment, the terahertz cross-correlation measurement is a layer thickness measurement, where individual layer thicknesses of a multilayer structures can be measured contact free and nondestructively. Here, a sample is placed in a reflection setup as illustrated in FIGS. 4-5. When the device is on, THz radiation 5a from THz transmitter 4 is impingent on the surface of the sample 8, and the reflected THz signal 5b is detected by the THz receiver 6. In the THz receiver 6, the CW optical signal 3 and the incident THz radiation 5b overlaps and results in a photocurrent that is a cross correlation of the optical field and the THz wave. The photocurrent signal is amplified and recorded and fed to an electronic processor (see 34 in FIG. 1) where the thicknesses, and possibly the optical parameters, of the layers of the sample can be determined. In another exemplary embodiment, the terahertz cross-correlation measurement is a non-destructive inspection or quality assurance, such as non-destructive inspection or quality assurance of layer thicknesses and surfaces.

LIST OF REFERENCE NUMBERS

1. THz cross-correlation device
2. optical source
3. CW optical signal
4. THz transmitter
5. THz radiation/signal
6. THz receiver
7. THz optics
8. sample
10. optical path of THz cross-correlation device
11. optical waveguide
12. light source
13. optical amplifier
14. spectrum of CW optical signal
15. beam splitter
16. optical delay setup
18. double-pass polarization-conserving fibre stretcher
20. optical circulator
22. fibre stretcher
24. Faraday mirror
26. variable solid state optical delay
28. optical input/output port
30. optical waveguide sections
32. actuation means

34. electronic processor
36. substrate

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

Certain features discussed above as separate implementations can also be implemented in combination as a single implementation. Conversely, features described as a single implementation can also be implemented in multiple implementations separately or in any suitable sub-combination. Moreover, although features may be described above as acting in certain combinations, one or more features from a claimed combination can, in some cases, be excised from the combination, and the combination may be claimed as any sub-combination or variation of any sub-combination It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the examples may be implemented at least in part by means of both hardware and software, and that several "means", "units" or "devices" may be represented by the same item of hardware.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount or a quality or characteristic—such as the continuity of an optical spectrum—that is within less than or equal to 10% of, within less than or equal to 5% of, within less than or equal to 1% of, within less than or equal to 0.1% of, and within less than or equal to 0.01% of the stated amount, quality or characteristic.

The invention claimed is:

1. A terahertz (THz) cross-correlation device for measurement of a sample by means of electromagnetic radiation with frequencies between 0.1 THz and 10 THz, the device comprising:
   an optical source for outputting a continuous-wave (CW) optical signal;
   a THz transmitter optically coupled to the optical source, the THz transmitter configured to emit THz radiation towards a sample when modulated by the CW optical signal;
   a THz receiver optically coupled to the optical source, the THz receiver being configured to detect THz radiation that has interacted with the sample by generating an electric detection signal that is a result of an interference between the THz radiation and the CW optical signal;

a beam-splitter for receiving the CW signal from the optical source and defining a first arm providing optical coupling between the beam splitter and the THz transmitter, and a second arm providing optical coupling between the beam splitter and the THz receiver; and an optical delay setup configured to adjust a synchronization of the THz receiver to the THz transmitter by the CW optical signal;

wherein:

the optical source is configured to provide a CW optical signal having a continuous broadband spectrum;

optical paths for the CW signal from the optical source to the optical delay component, the THz transmitter, and the THz receiver are provided by optical waveguides;

the optical delay setup comprises a first double-pass polarization-conserving fibre stretcher in the first arm and a second double-pass polarization-conserving fibre stretcher in the second arm, each double-pass polarization-conserving fibre stretcher comprising a circulator, a fibre stretcher, and a Faraday mirror arranged for the circulator and the fibre stretcher to receive the CW optical signal propagating in a first direction and in a second, opposite, direction, the change in direction being due to a reflection in the Faraday mirror.

2. The terahertz cross-correlation device according to claim 1, wherein the first and second double-pass polarization-conserving fibre stretchers are identical.

3. The terahertz cross-correlation device according to claim 1, wherein the optical source comprises a laser diode.

4. The terahertz cross-correlation device according to claim 1, wherein the optical source comprises a superluminescent diode (SLED).

5. The terahertz cross-correlation device according to claim 1, wherein the optical source comprises a source based on an amplified spontaneous emission (ASE).

6. The terahertz cross-correlation device according to claim 1, wherein the optical source comprises a fibre amplifier.

7. The terahertz cross-correlation device according to claim 1, wherein the optical delay setup further comprises a variable solid state optical delay (SSOD) comprising two or more optical ports, one or more optical waveguide sections for connecting two optical ports, and actuation means for varying an optical path length between the two connected optical ports.

8. The terahertz cross-correlation device according to claim 7, wherein the variable solid state optical delay provides a set of discrete optical delays that can be selected by the actuation means and where a largest difference between two following optical delays is D, and wherein at least one of the first and second double-pass polarization-conserving fibre stretchers is adapted to provide a continuous optical delay adjustment equal to or larger than D.

9. The terahertz cross-correlation device according to claim 7, wherein the variable solid state optical delay (SSOD) comprises two or more optical waveguide sections of different lengths for connecting two optical ports, and wherein the actuation means are configured to select one or a combination of the two or more optical waveguide sections to connect the two or more optical ports.

10. The terahertz cross-correlation device according to claim 1, wherein the optical source is not a multimode laser system.

11. A method of performing a terahertz cross-correlation measurement of a sample using the terahertz cross-correlation device according to claim 1.

* * * * *